VANSTRUM & LINDBERG.
Grain Drill.

No. 44,241. Patented Sept. 13, 1864.

UNITED STATES PATENT OFFICE.

C. G. VANSTRUM AND P. G. LINDBERG, OF RED WING, MINNESOTA.

SEEDING-MACHINE.

Specification forming part of Letters Patent No. 44,241, dated September 13, 1864.

*To all whom it may concern:*

Be it known that we, C. G. VANSTRUM and P. G. LINDBERG, both of Red Wing, in the county of Goodhue and State of Minnesota, have invented a new and Improved Seeding-Machine; and we do hereby declare that the following is a full, clear, and exact description of the same, reference being had to the accompanying drawings, forming a part of this specification, in which—

Figure 1:
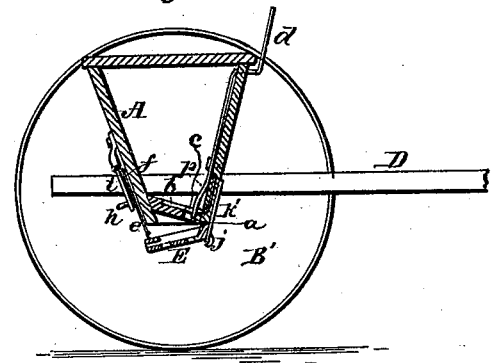
Figure 2:
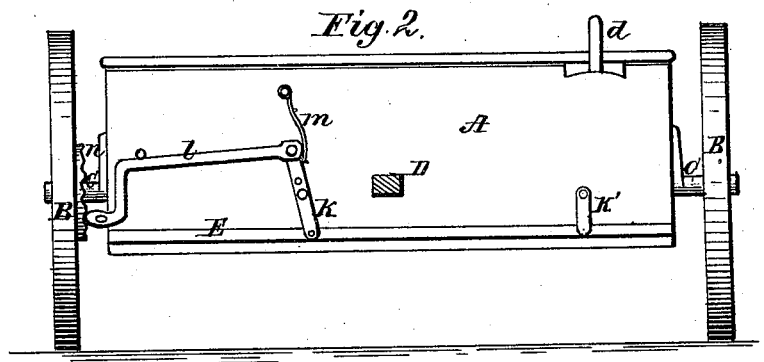
Figure 3:
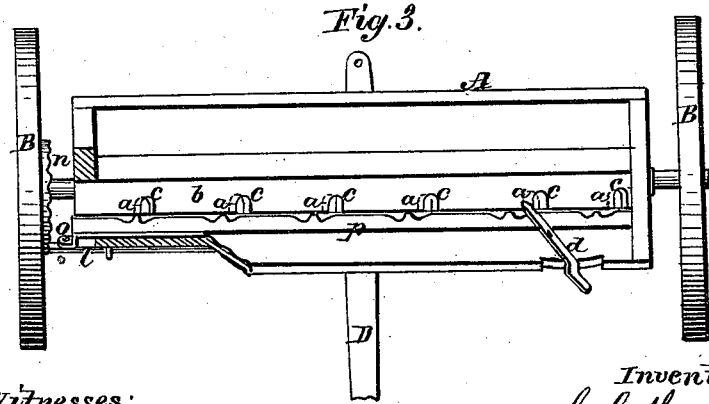

Figure 1 represents a tranverse vertical section of our invention. Fig. 2 is a front elevation of the same. Fig. 3 is a sectional plan or top view of the same.

Similar letters of reference in the three views indicate corresponding parts.

This invention relates to certain improvements in broadcast-seeding machines, which are so constructed that they can be used for different kinds of seed by a simple change in the distributing mechanism, or that the discharge of seed can be temporarily suspended while turning or driving from or to a field.

The nature of our invention and its peculiar advantages will be readily understood from the following description.

A represents the seed-box, which is made of wood or any other suitable material in the usual manner. It is suspended from two axles or gudgeons, C, which are secured to its ends and have their bearings in the wheels B B', as clearly shown in Figs. 2 and 3 of the drawings, and a draft-pole, D, serves to draw the machine over the field or to the desired place. This draft-pole extends through the seed-box, and its rear end may serve to attach a harrow for the purpose of harrowing in the seed as soon as it reaches the ground. The bottom of the seed-box is inclined toward the front part of the machine, and it is perforated with a series of holes, *a*, large enough for the largest seed that may ever be sown by the aid of this machine. The size or capacity of the holes *a* may be regulated by a slide, *b*, which is mortised in the bottom of the seed-box, as clearly shown in Fig. 1, and provided with a series of holes, *c*, corresponding in size and position to the holes *a* in the bottom, so that by changing the position of the slide *b* the holes *c* can be made to register with the holes *a*, or the solid portions of the slide may be made to cover partly or wholly the holes *a*, and the capacity of these holes can be regulated. The slide *b* is operated by a hand-lever, *d*, which is pivoted to the front side of the box A and extends upward through a mortise, so that it can be conveniently reached and operated by the driver sitting on the cover of the seed-box.

The seed on being discharged from the box A drops upon the scattering-board E, which is hinged to the lower front edge of the hopper, its loose edge being suspended from a rope or chain, *e*, so that it can be lowered or raised to suit circumstances, and the scattering-board is set to the desired inclination by winding the rope *e* round a pulley, *f*, which is secured to a pin projecting from the rear side of the box. This pin also carries a ratchet-wheel, *g*, which is rotated by means of a handle, *h*, and held in the desired position by a pawl, *i*. By raising the pawl the ratchet-wheel and pulley can be turned backward, the rope unwinds from the pulley, and the loose edge of the scattering-board is lowered, and when the pawl is thrown in gear with the ratchet-wheel the scattering-board can be raised to and held in any desired position.

The hinges which secure the scattering-board to the box A are composed of hooks *j*, projecting from the edge of the board and catching in holes in the lower ends of pendent levers *k k'*, which are pivoted to the front side of the hopper-box, as clearly shown in Fig. 2 of the drawings. The lever *k* extends upward beyond its fulcrum, and it connects with a tappet, *l*, the point of which is forced by a spring, *m*, against the scalloped edge of a circular flange, *n*, secured to the inner side of the wheel B. The front part of the tappet connects by a rivet or in any other suitable manner with an arm, *o*, which is rigidly attached to a sliding toothed plate or stirrer, *p*. As the wheel B rotates the scalloped edge of the flange *n* produces a reciprocating motion of the scattering-board E and stirrer *p*, and the teeth of the latter, by sweeping over the seed-holes *c a*, prevent them from clogging and insure a uniform discharge, and at the same time, by the shaking motion imparted to the scattering-board, the seed is evenly distributed over the ground.

If it is desired to discontinue the shaking motion of the scattering-board and stirrer, the tappet *l* is pressed back by inserting a pin or stop in its front, so that the scalloped flange revolves without coming in contact with the point of the tappet.

This machine is very simple in its construction. It can be made cheap and used for large or small seeds, and all its parts are so constructed that they are not liable to get out of repair.

What we claim as new, and desire to secure by Letters Patent, is—

The adjustable hinged scattering-board E, in combination with the pendent levers $k$, tappet $l$, scalloped flange $n$, stirrer $p$, and adjustable seed-slide $b$, all constructed and operating in the manner and for the purpose herein shown and described.

C. G. VANSTRUM.
P. G. LINDBERG.

Witnesses:
FRANK IVES,
S. J. WILLARD.